United States Patent
Reed et al.

(10) Patent No.: US 6,304,231 B1
(45) Date of Patent: Oct. 16, 2001

(54) UTILITY METER LABEL SUPPORT AND ANTENNA

(75) Inventors: Eric B. Reed, East Berlin; Paul Rajotte, Plainville, both of CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/168,370

(22) Filed: Oct. 7, 1998

(51) Int. Cl.⁷ .................................................. H01Q 1/40
(52) U.S. Cl. ........................... 343/873; 343/872; 343/702
(58) Field of Search .................................... 343/873, 702, 343/872, 700 MS; 340/540; 361/667; H01Q 1/40

(56) References Cited

U.S. PATENT DOCUMENTS

| | | |
|---|---|---|
| Re. 31,359 | 8/1983 | Nickola . |
| 3,729,727 | 4/1973 | Young et al. . |
| 4,311,354 | 1/1982 | Robinson et al. . |
| 4,904,995 | 2/1990 | Bonner et al. . |
| 5,056,107 | 10/1991 | Johnson et al. . |
| 5,111,407 | 5/1992 | Galpern . |
| 5,145,403 | 9/1992 | Schaffert et al. . |
| 5,416,475 | 5/1995 | Tolbert et al. . |
| 5,519,387 | 5/1996 | Besier et al. . |
| 5,619,192 | 4/1997 | Ayala . |
| 5,774,328 | * 6/1998 | Rector et al. ......................... 361/667 |
| 5,920,290 | * 7/1999 | McDonough et al. ................ 343/873 |

* cited by examiner

Primary Examiner—Hoanganh Le
(74) Attorney, Agent, or Firm—Carl B. Horton, Esq.; Damian Wasserbauer, Esq.; Armstrong Teasdale LLP

(57) ABSTRACT

A utility meter label support and antenna are described. The label support supports a product label and an antenna for radio frequency-based, remote meter reading capability, all within standard type utility meter housing. In one embodiment, the label support is fabricated from molded plastic and includes a plurality of support members connected to a substantially planar member. The support members are configured to insert into openings in the printed circuit board of the utility meter. The antenna is embedded in a flexible circuit and mounted on the planar member. A conducting element is embedded in a portion of the flexible circuit and is configured to physically and electrically connect the antenna to a transceiver on the circuit board. A product label is mounted on the label support and may be viewed through a transparent window in the meter housing.

24 Claims, 2 Drawing Sheets

UTILITY METER LABEL SUPPORT AND ANTENNA

FIELD OF THE INVENTION

This invention relates generally to utility meter assemblies and more particularly, to a meter antenna for radio-based automatic meter reading systems.

BACKGROUND OF THE INVENTION

Utility meters are used to determine the amount of a utility, such as electricity, gas or water, consumed at a given site. In particular, conventional residential electric meters are watt-hour meters which measure total energy consumed at the site and indicate the usage in standard kilowatt hours. Modern residential electric meters typically include solid-state electronics for monitoring, storing and displaying utility usage data over time. Total energy consumed, as well as other data, is digitally displayed.

For billing and management purposes, a utility provider periodically sends a meter reader to the site to directly view and report the meter display. Data from the meter may also be downloaded from the meter into a handheld device. This is a time-consuming and costly process which has produced a growing demand for more cost-efficient methods of utility accounting.

In response to the growing demand, automatic meter reading (AMR) technologies have been introduced, including radio-based, telephone line based, and power line based systems. Known radio-based apparatus and methods include meters equipped with low power radio frequency transmitters to transmit utility usage data from the meter to a central location such as a mobile van unit, or a central building. Optimal transmission efficiency requires an antenna equal in length to about ¼ the wavelength of the transmission frequency. In particular, at the low frequencies typically used in remote meter assemblies, optimal transmission efficiency requires the use of antennas having lengths which are difficult to incorporate within a standard meter housing.

Known radio meter assemblies address this problem by using a non-standard meter housing having towers or projections to accommodate an antenna projecting from the meter assembly. However, the manufacture of such specially designed, non-standard meter housings is costly. Further, the towers or projections can present obstacles for individuals passing or working near the meter assembly.

Thus it would be desirable to provide a utility meter apparatus which includes a suitable antenna within a standard type meter housing. It would be further desirable to provide such apparatus which is simple and inexpensive to manufacture. In addition, it is generally desirable in providing meter apparatus to minimize the number and size of components and mounting hardware to minimize costs and labor. It would also therefore be desirable to provide utility meter apparatus which integrates a suitable antenna with other meter components, to minimize costs and labor.

SUMMARY OF THE INVENTION

These and other objects are attained by a utility meter label support and antenna which are incorporated in a standard meter housing. In one embodiment, the meter label support and antenna are included in a solid state electronic meter assembly. The assembly generally includes solid state electronics on a printed circuit board, and a remote module including a radio transceiver. The label support is fabricated substantially from plastic and generally includes a substantially planar member on which is mounted the antenna. A label such as a product label, name plate or the like which includes information such as the name and address of the meter manufacturer, or service information, is also mounted on the label support. Multiple support members extend from the substantially planar member and include insertion tabs for securing the label support to the printed circuit board. A conducting element extends from the antenna to the printed circuit board. The meter assembly further generally includes a current/voltage sensor assembly linking the electrical supply through a transducer to acquisition, storage and display circuits on the printed circuit board.

In use and in one embodiment, the antenna in the flexible circuit is mounted with adhesive on the label support, and the label mounted over the antenna. The label support with attached antenna is generally included when the utility meter assembly is assembled for mounting on a residence or other building. More specifically, the label support is secured to the printed circuit board by inserting the tabs through openings in the circuit board. Upon insertion of the tabs into the printed circuit board, the conducting element provides an electrical connection between the transceiver and the antenna. The sensor assembly communicates the usage data to acquisition electronics on the printed circuit board. The transceiver provides a signal representing the usage data, and uses the antenna to transmit the signal to a remote location where a remote receiving apparatus reads the signal.

The utility meter label support and antenna described above provide an antenna which is both suitable for transmission of utility usage data and incorporated within standard type meter housing. Further, by integrating the label support and antenna, the described label support and antenna provides remote meter apparatus which reduces the size of components and the amount of mounting hardware, thus reducing costs and labor.

DETAILED DESCRIPTION

Figure 1:
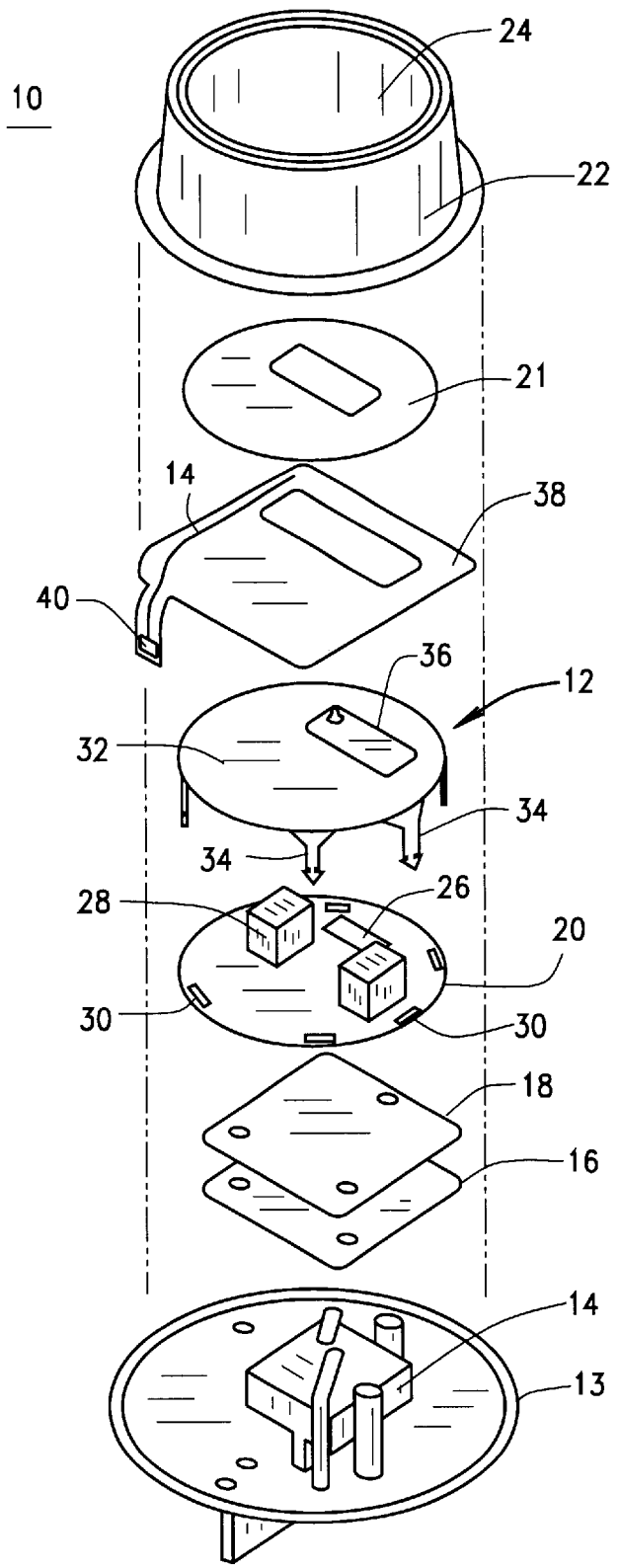
FIG. 1 is a perspective view of a utility meter assembly including a label support and an antenna.

FIG. 1 is a perspective view of a standard type utility meter assembly 10 including a label support 12 and an antenna 14. In one embodiment, assembly 10 is a residential electric utility meter with remote reading capability. Assembly 10 generally further includes a base 13, a current/voltage sensor assembly 14, an insulator plate 16, a shield plate 18, a printed circuit board (PCB) 20, a label 21, and a cover 22 with a transparent window 24. Board 20 includes a digital display 26, a transducer (not shown), circuits for acquisition, storage and display (not shown), and a module 28 with a radio frequency transceiver. Board 20 has multiple openings 30, such as holes or slots. Sensor assembly 14 is configured to be electrically coupled to a power line supplying energy to, for example, a residence, and senses current and voltage signals on the power line. The display circuits on board 20 are linked to display 26 to provide a visual readout of information from sensor assembly 14.

Generally, sensor assembly 14 is mounted on base 13. Insulator plate 16 is positioned over assembly 14, shield plate 18 is positioned over insulator 16, and board 20 is positioned over shield plate 18. Insulator plate 16, shield plate 18 and board 20 are secured together to base 13 using hardware such as screws, bolts or the like. Antenna 14 and label 21 are mounted on label support 12 which is secured to board 20 as described below. Cover 22 together with base 13 forms a standard meter housing as well known in the art.

Figure 2:
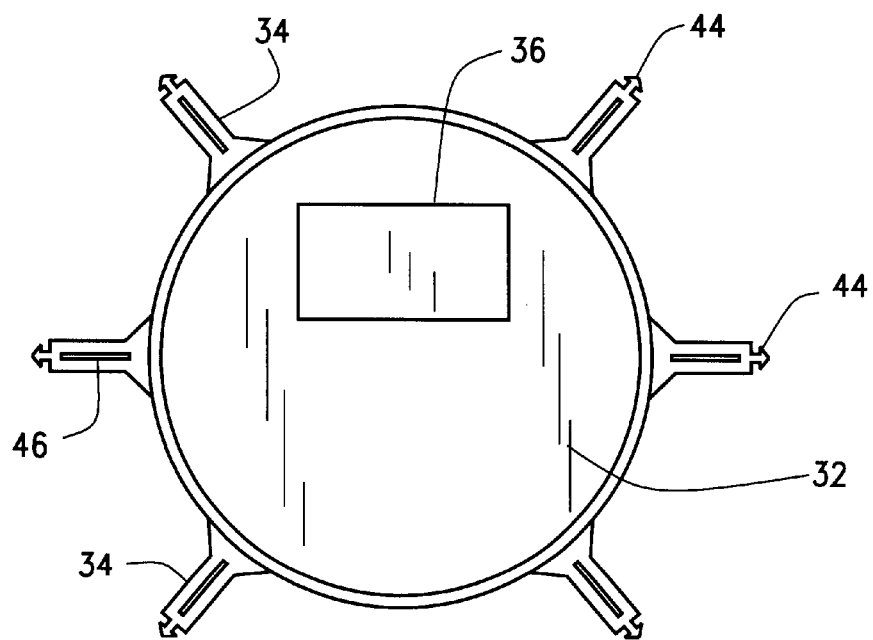
FIG. 2 is a top plan view of the label support.

FIG. 2 is a top plan view of one embodiment of label support 12. Support 12 includes a substantially planar member 32 and multiple support members 34 extending from planar member 32. Planar member 32 further includes an opening 36 for viewing the display (not shown in FIG. 2) on board 20. Support members 34 are configured to secure member 32 to board 20. In one embodiment, member 32 is substantially circular in shape and includes six substantially Y-shaped support members 34 extending from the outer edge of member 32. Each member 34 includes a tab 44 extending from the base of the Y-shape. In one embodiment, members 34 include a longitudinal score 46. Tabs 44 are shaped so that they may be readily inserted into but not readily withdrawn from openings 30 (not shown in FIG. 2), thereby securing label support 12 to board 20. For example, tabs 44 may be tapered as shown in FIG. 2.

Member 32 and support members 34 are molded or stamped substantially as a unit from a plastic such as Valox®, available from the General Electric Company of Pittsfield, Mass. Alternatively, label support 12 and antenna 14 may be fabricated from other suitable plastics or materials, such as Lexan®, also available from General Electric. In one embodiment, label support 12 is fabricated as a substantially planar unit and members 34 are hingedly connected to member 32 so that the position of members 34 relative to planar member 32 may be adjusted for insertion of tabs 44 into the openings in board 20. For example, members 34 may be connected to planar member 32 by thin, flexible portions of the plastic (not shown), plastic webbing, or perforated plastic. Members 34 may be folded along score 46 so that members 34 may substantially conform to the curvature of planar member 32 when members 34 are adjusted for insertion of tabs 44 into the openings in board 20. Alternatively, members 34 may be formed without score 46. In addition, label support 12 may be formed as a unit in which members 34 are substantially rigidly connected to member 32 and positioned so that tabs 44 insert into openings 30.

Figure 3:
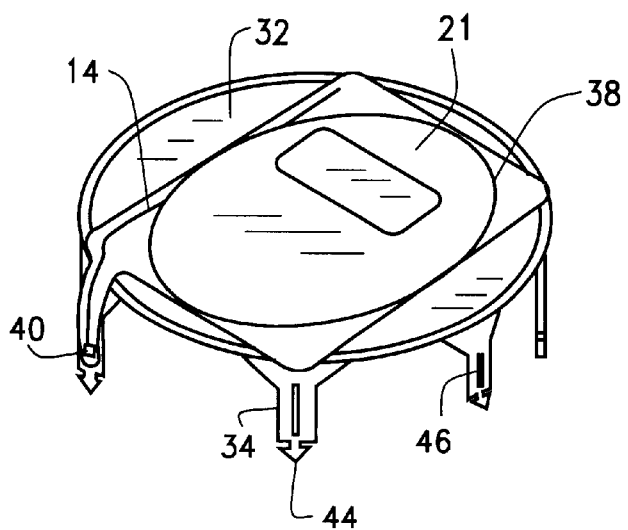
FIG. 3 is a perspective view of the label support, a label and the antenna.

As shown in FIG. 3, and in one embodiment, antenna 14 is mounted on label support 12. Antenna 14 is embedded in a flexible circuit 38, for example of a type typically used in membrane keypads. A conducting element 40, for example a contact patch, is embedded in flexible circuit 38 to provide a physical and electrical connection between antenna 14 and the circuit on board 20. Label 21 is generally a product label or name plate which includes information such as manufacturer name and address, utility provider name and address, service instructions, or the like. Label 21 may be, for example, a paper, plastic or metal label, and may be self-adhesive. Label 21 is mounted on label support 12 by mounting on flexible circuit 38, or alternatively, label 21 may be attached directly to planar member 32 of label support 12 .

Antenna 14 and conducting element 40 are fabricated from a conductive material such as a metal. Antenna 14 is generally linear in shape and is about 8 cm to about 12 cm long. In one embodiment the antenna is about 10 cm long, but the length may be varied. The shape of antenna 14 may of course also be varied, but the antenna should not double back on itself. The length and shape of antenna 14 are subject to the requirement that antenna 14 carry up to about 200 milliwatts. The transceiver in remote module 28 operates at a frequency of about 900 M Hz.

In use, and referring again to FIG. 1, antenna 14 is embedded in flexible circuit 38 which is mounted with adhesive on planar member 32. Label 21 can be viewed through transparent window 24 of cover 22. Label support 12, with antenna 14 and label 21, is mounted on board 20 by positioning members 34 over openings 30, and then inserting tabs 44 through openings 30. When label support 12 is mounted on circuit board 20, conducting element 40 forms an electrical connection between antenna 14 and circuits on board 20 connected to the transceiver in remote module 28.

Usage data supplied to module 28 may include, for example, time-of-use information, peak demand, load survey, tamper detection and power outage recording. The transceiver in module 28 provides a signal representing the meter address and usage data. The signal characteristics are suitable for transmitting the data to a central location, such as a central station, or mobile unit operated by a utility company. The transceiver, through the conducting element, provides an excitation signal to antenna 14 to transmit the data to the central location where a receiving apparatus reads the usage data. The transceiver is also equipped to receive a signal, such as a "wake-up" signal, transmitted from the central location to prompt the meter to transmit the meter address and usage data to the central location.

For example, to gather usage data from radio-equipped meters having label support 12 and antenna 14, a transmitter, such as a short range transmitter, transmits a "wake-up" signal to radio-equipped meters within signal range. Antenna 14 is used to receive the "wake-up" signal, and also when the meter electronics respond by transmitting data representing the meter address and usage data. The radio meter reading method may use, for example, a mobile system including a vehicle-based or handheld radio communications device, or both.

In alternative embodiments, label support 12 and antenna 14 may be used in any remote utility meter assembly requiring both a label support 12 and an antenna. For example, label support 12 and antenna 14 may be used in meters by equipped with hybrid automatic meter reading systems, such as those which combine both radio and telephone line communications, or both radio and power line communications. Label support 12 and antenna 14 may be used in radio-based automatic meter reading systems employing unlicensed, low-power radio frequencies or spread spectrum communications, or licensed radio communications such as AM radio, FM Subsidiary Communications Authorization communications, or UHF band radio.

The precise shape and configuration of label support 12 may be varied. For example, the shape of planar member 32, support members 34, and tabs 44 may be varied, limited only by the requirements that label support 12 and antenna 14 fit within standard type meter housing as known in the art, and that planar member 32 is of a size sufficient for antenna 14 to be embedded in member 32. Tabs 44 may be replaced by hooks, prongs or the like which secure label support 12 and antenna 14 to circuit board 20 by gripping the edge of circuit board 20. Alternatively, support members 34 may be configured with openings to cooperate with securing hardware such as screws, or with other mounting hardware as known in the art. Label support 12 may instead be configured to be secured to other components of the meter assembly, such as the sensor assembly.

In another alternative embodiment, contact patch 40 on flexible circuit 38 is instead configured as a cable, for example a ribbon-type cable, formed from a portion of flexible circuit 38 and having a connector attached to a free end. The connector is then inserted into a mating connector on board 20 to make the physical and electrical connection between antenna 14 and the circuit on board 20. Alternatively, the connection between antenna 14 and the electronics on board 20 may be made by attaching a wire to antenna 14 and connecting the wire to the transceiver on board 20.

The utility meter label support 12 and antenna 14 provides an antenna which can easily be incorporated within a standard type meter housing, yet is suitable for the low-frequency transmission of utility usage data. Antenna 14 is supported on a label support 12 within standard meter housing, reducing the number of specialized components and mounting hardware, and thus reducing costs and labor.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An antenna for inclusion within a standard utility meter housing, said antenna comprising a conductive material embedded in a flexible circuit and configured for attachment to a substantially planar member of a label support which is configured to mount on a circuit board within the meter housing.

2. The antenna in accordance with claim 1 further comprising a conducting element embedded in said flexible circuit, said conducting element coupled to said antenna for connecting said antenna with an electronic circuit on a circuit board of a utility meter.

3. The antenna in accordance with claim 2, said antenna conductive material exclusive of said conducting element configured to be approximately eight to twelve centimeters in length, said antenna further configured to transmit a radio-frequency signal representing meter usage data from a utility meter.

4. The antenna in accordance with claim 2, said antenna conductive material exclusive of said conducting element configured to be approximately eight to twelve centimeters in length, said antenna further configured to receive a radio-frequency signal representing a prompt signal from a central location.

5. A label support and antenna for securing to a circuit board of a utility meter, wherein the circuit board includes radio frequency electronics, said label support and antenna comprising:
   a substantially planar member;
   a plurality of support members extending from said substantially planar member, said support members for securing said substantially planar member to the circuit board;
   an antenna embedded in a flexible circuit, said flexible circuit mounted on the substantially planar member; and
   a conducting element for making an electrical connection between said antenna and the electronics in the circuit board, said conducting element embedded in said flexible circuit.

6. The label support and antenna in accordance with claim 5 wherein said plurality of support members comprises a plurality of elongate members configured to grip an edge of the circuit board.

7. The label support and antenna in accordance with claim 5 wherein the circuit board has a plurality of openings and wherein said plurality of support members comprises a plurality of elongate members configured to insert into a plurality of openings through the circuit board.

8. The label support and antenna in accordance with claim 7 wherein said plurality of elongate members comprise tabs configured to be inserted into the plurality of openings in the circuit board.

9. The label support and antenna in accordance with claim 5 further comprising a plurality of hinged connections between said planar member and said support members.

10. A utility meter comprising:
    a base;
    a cover configured to mount to said base;
    a current/voltage sensor assembly configured to mount on said base and to couple to a power line;
    a circuit board further comprising a display, said circuit board electrically coupled to said sensor assembly;
    a label support mounted on said circuit board; and
    an antenna completely enclosed within said base and said cover and attached to said label support.

11. A utility meter according to claim 10 wherein said label support further comprises:
    a substantially planar member; and
    at least one support member extending from said substantially planar member, said support member configured to secure said label support to said circuit board.

12. A utility meter according to claim 11 wherein said circuit board further comprises:
    at least one opening therethrough, and wherein said support member comprises at least one tab configured to insert through said opening.

13. A utility meter in accordance with claim 11 further comprising a hinged connection between said planar member and said at least one support member.

14. A utility meter in accordance with claim 11 wherein said substantially planar member has an opening therethrough.

15. A utility meter in accordance with claim 10 comprising a plurality of support members.

16. A utility meter in accordance with claim 10 wherein said antenna further comprises a conductive material embedded in a flexible circuit.

17. A utility meter in accordance with claim 10 wherein said antenna further comprises a conducting element embedded in said flexible circuit, said conducting element coupled to said antenna for connecting said antenna with an electronic circuit on said circuit board.

18. A utility meter in accordance with claim 17 wherein said electronic circuit and said antenna configured to transmit a radio-frequency signal representing utility usage data as measured by said meter.

19. A utility meter in accordance with claim 17 wherein said electronic circuit and said antenna configured to receive a radio-frequency signal representing a prompt signal from a central location.

20. An antenna assembly for a utility meter assembly having a circuit board, said antenna assembly comprising:
    a label support comprising a substantially planar member, said label support configured to mount on the circuit board;

at least one support member extending from said substantially planar member, said support member configured to secure said label support to the circuit board; and an antenna attached to said label support.

21. An antenna assembly in accordance with claim 20 wherein said circuit board has at least one opening therethrough, and wherein said support member comprises at least one tab configured to insert through said opening.

22. The antenna assembly in accordance with claim 20 wherein said label support further comprises a hinged connection between said planar member and said at least one support member.

23. The antenna assembly in accordance with claim 20 wherein said substantially planar member has an opening therethrough.

24. The antenna assembly in accordance with claim 20 wherein said label support further comprises a plurality of support members.

\* \* \* \* \*